(12) United States Patent
Outhred et al.

(10) Patent No.: US 8,935,427 B2
(45) Date of Patent: Jan. 13, 2015

(54) PROVIDING VIRTUAL NETWORKS USING MULTI-TENANT RELAYS

(75) Inventors: Geoffrey H. Outhred, Seattle, WA (US); Hasan Shamsuddin Alkhatib, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 513 days.

(21) Appl. No.: 12/889,283

(22) Filed: Sep. 23, 2010

(65) Prior Publication Data

US 2012/0079134 A1    Mar. 29, 2012

(51) Int. Cl.
G06F 15/173 (2006.01)
H04L 12/46 (2006.01)

(52) U.S. Cl.
CPC .................. *H04L 12/4641* (2013.01)
USPC ......................................................... 709/244

(58) Field of Classification Search
CPC ................................................. H04L 12/4641
USPC ......................................................... 709/244
See application file for complete search history.

(56) References Cited

U.S. PATENT DOCUMENTS

| | | | | |
|---|---|---|---|---|
| 8,060,594 | B1 * | 11/2011 | Clavel et al. | 709/223 |
| 8,271,640 | B2 * | 9/2012 | Salkewicz | 709/223 |
| 2003/0214955 | A1 * | 11/2003 | Kim | 370/400 |
| 2005/0138162 | A1 * | 6/2005 | Byrnes | 709/223 |
| 2007/0130130 | A1 | 6/2007 | Chan et al. | |
| 2007/0294407 | A1 | 12/2007 | Owen | |
| 2008/0119130 | A1 * | 5/2008 | Sinha | 455/1 |
| 2009/0028162 | A1 | 1/2009 | Hu | |
| 2009/0037976 | A1 * | 2/2009 | Teo et al. | 726/1 |
| 2009/0288084 | A1 | 11/2009 | Astete et al. | |
| 2010/0121923 | A1 | 5/2010 | Cvetkovic | |
| 2010/0125612 | A1 | 5/2010 | Amradkar | |
| 2010/0125902 | A1 * | 5/2010 | Killian et al. | 726/15 |
| 2010/0165846 | A1 * | 7/2010 | Yamaguchi et al. | 370/236 |
| 2010/0241696 | A1 * | 9/2010 | Matoba | 709/203 |

(Continued)

FOREIGN PATENT DOCUMENTS

WO    WO 2008035600 A1 *   3/2008

OTHER PUBLICATIONS

Myriad, Internet Solutions, Virtual Private Netwrok (VPN), http://www.myriadcommunications.com/products.html, Pub. Date Apr. 25, 2006, (2 pages).

(Continued)

*Primary Examiner* — Bryan Lee
(74) *Attorney, Agent, or Firm* — Ben Tabor; David Andrews; Micky Minhas

(57) ABSTRACT

Embodiments are directed to providing a multi-tenant relay service that securely relays data between computer systems. A computer system receives a portion of data that is to be passed from a first computer system belonging to a first tenant to a second, different computer system. The instantiated multi-tenant relay service is configured to securely relay data for multiple different tenants. The computer system creates a secure routing channel for routing the data of the first tenant between the first computer system and the second computer system. The secure routing channel applies a unique identifier to each portion of data received from the first tenant. The computer system also routes the received data from the first computer system to the second computer system through the secure routing channel using the applied unique identifier.

20 Claims, 4 Drawing Sheets

(56) References Cited

U.S. PATENT DOCUMENTS

2012/0047253 A1*  2/2012  Garg et al. .................... 709/224
2013/0239228 A1*  9/2013  Cinarkaya et al. .............. 726/27

OTHER PUBLICATIONS

Deploying Secure Multi-Tenancy into Virtualized Data Centers, http://www.cisco.com/en/US/docs/solutions/Enterprise/Data_Center/Virtualization/securecl . . . , Pub. Date: Apr. 5, 2010, (44 pages).
White Paper, Multi-Tenant Internet Services, Pub. Date: Oct. 19, 2004, Copyright 1999, (9 pages).
ZyXEL Strengthens Its Multi-Tenant Unit (MTU) Portfolio with the New InterTenant Network Solution, http://www.zyxel.in/web/news_news.php?sqno=333, Pub. Date: Mar. 22, 2001 (2 pages).
OmniPCX Enterprise, Distributed Systems and Networking, Pub. Date: Aug. 6, 2010 (Retrieved Date) (12 pages).

* cited by examiner

PROVIDING VIRTUAL NETWORKS USING MULTI-TENANT RELAYS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a client computer system may be configured to request a service from a service provider. The service provider may receive requests from various clients and, in response to the requests, provide the service. Providing the service may include transmitting various communications between the provider and client computer systems. Oftentimes, these computer systems are on different computer networks, separated or blocked off by various hardware or software devices such as routers and firewalls.

In some cases, virtual private networks (VPNs), relays or other secure communication channels may be established between computer systems that are on separate networks. Relays, however, are typically either private to an organization or are public, allowing access any user, including potentially harmful users.

BRIEF SUMMARY

Embodiments described herein are directed to providing a multi-tenant relay service that securely relays data between computer systems. In one embodiment, a computer system receives a portion of data that is to be passed from a first computer system belonging to a first tenant to a second, different computer system. The instantiated multi-tenant relay service is configured to securely relay data for multiple different tenants. The computer system creates a secure routing channel for routing the data of the first tenant between the first computer system and the second computer system. The secure routing channel applies a unique identifier to each portion of data received from the first tenant. The computer system also routes the received data from the first computer system to the second computer system through the secure routing channel using the applied unique identifier.

In another embodiment, a computer system receives a portion of data that is to be passed from a first computer system to a second, different computer system. The instantiated multi-tenant relay service is configured to relay data for multiple different tenants. The computer system creates a secure routing channel for routing the data between the first computer system and the second computer system. The secure routing channel provides a unique identifier to each portion of data received from the first tenant. The computer system determines which of various different network protocols are available for routing the received data, and, based on the determination of which network protocols are available, dynamically selects an appropriate protocol that optimizes data transport efficiency. The computer system also routes the received data from the first computer system to the second computer system using the determined protocol. The data is routed through the secure routing channel using the applied unique identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
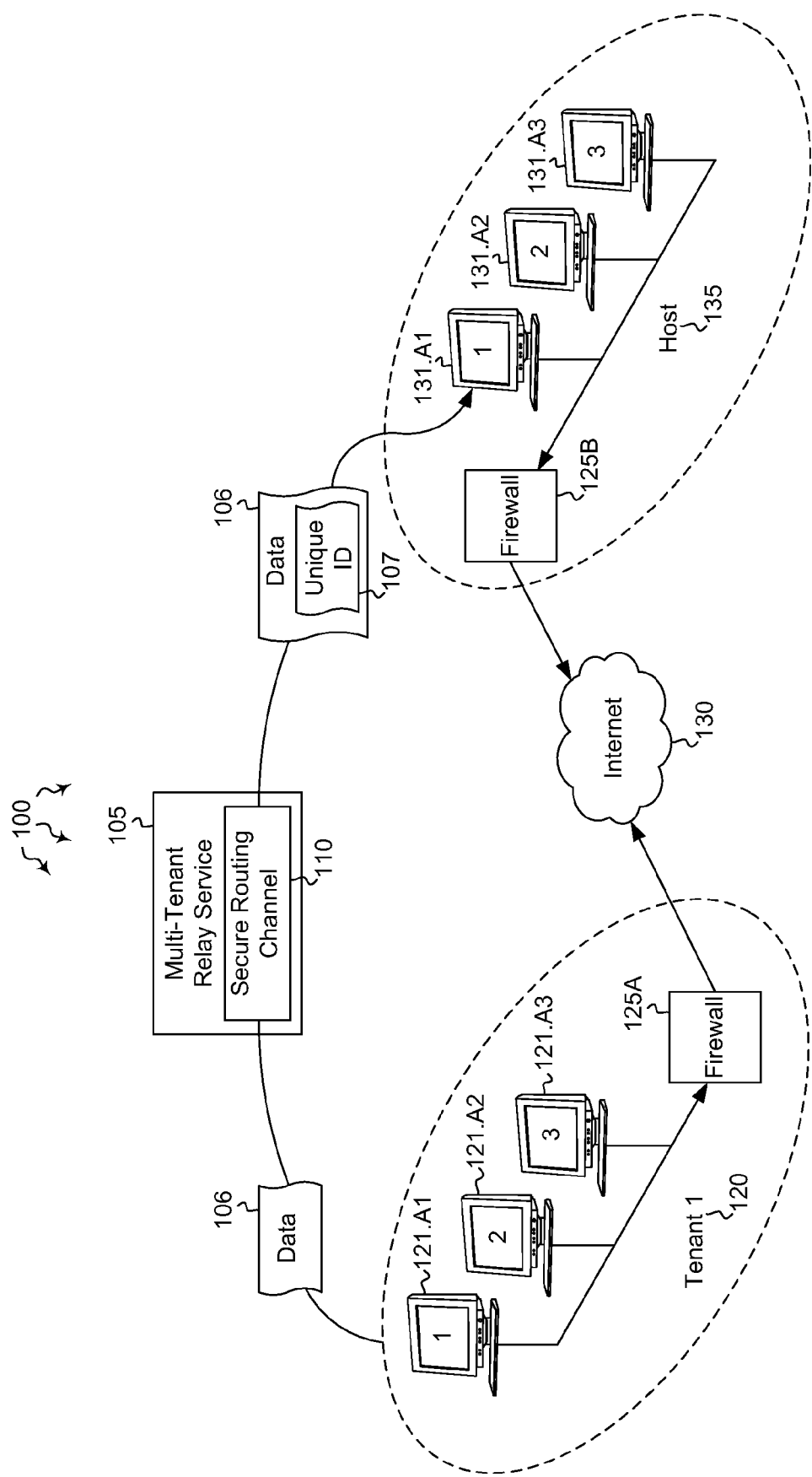
FIG. 1 illustrates a computer architecture in which embodiments of the present invention may operate including providing a multi-tenant relay service that securely relays data between computer systems.

Embodiments described herein are directed to providing a multi-tenant relay service that securely relays data between computer systems that cannot route secure connections between each other directly. In one embodiment, a computer system receives a portion of data that is to be passed from a first computer system belonging to a first tenant to a second, different computer system. The instantiated multi-tenant relay service is configured to securely relay data for multiple different tenants. The computer system creates a secure routing channel for routing the data of the first tenant between the first computer system and the second computer system. The secure routing channel applies a unique identifier to each portion of data received from the first tenant. The computer system also routes the received data from the first computer system to the second computer system through the secure routing channel using the applied unique identifier.

In another embodiment, a computer system receives a portion of data that is to be passed from a first computer system to a second, different computer system. The instantiated multi-tenant relay service is configured to relay data for multiple different tenants. The computer system creates a secure routing channel for routing the data between the first computer system and the second computer system. The secure routing channel provides a unique identifier to each portion of data received from the first tenant. The computer system determines which of various different network protocols are available for routing the received data, and, based on the determination of which network protocols are available, dynamically selects an appropriate protocol that optimizes data transport efficiency. The computer system also routes the received data from the first computer system to the second computer system using the determined protocol. The data is routed through the secure routing channel using the applied unique identifier.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes tenant 120 and host 135 which communicate over the internet 130. The tenant and the host may be configured to communicate through firewalls 125A and 125B. In addition to the firewalls, the communications may go through routers, switches, gateways or other network communications devices. Tenant 120 may have substantially any number of computer systems. For instance, a tenant may be an organization such as a government entity, school, corporation or other business entity that may have many hundreds, thousands or more computer systems. Or, a tenant may be a single user with a single computer system. Accordingly, it will be understood that while tenant 1 (120) is shown as having three computer systems (121A1, 121A2 and 121A3) in FIG. 1, the tenant may have any number of computer systems.

Correspondingly, host 135 may also have any number of computer systems and may provide or host any number of services. The host may be a multi-tenant host which hosts a variety of different services for different tenants. Each tenant may subscribe to different services or even different versions of services. Each of the tenant's users then has access to those services. The multi-tenant host verifies the identity of the user as being part of a certain client or tenant, and provides those services subscribed to by that tenant. Each tenant's settings, configurations, subscriptions, stored documents and other items are kept separate from all other tenant's information. In some cases, host 135 may be a cloud-based host, distributed among a plurality of different computer systems which may be physically located anywhere in the world. As such, any computer system of the host may provide tenant-requested services.

In some embodiments, a virtual network may be established between tenant 120 and host 135. The virtual network may use multi-tenant relay service 105 (or "service 105" herein) to securely transfer data between the tenant and the host. The tenant may send data 106 through a secure routing channel 110 established by service 105. The data sent from each different tenant may be tagged with a unique identifier (unique ID 107) indicating which tenant the data was received from. The data 106 may travel through a virtual private network (VPN), through a secure sockets layer (SSL) tunnel or other secure means of communication.

In some cases, this virtual network may be described as a network virtualization layer that manages the creation and address assignment for tenant computer systems connected to the virtual network. The multi-tenant relay service 105 may support connectivity between computer systems that participate in the virtual network. The network virtualization layer may expose internet protocol (IP) endpoints as network adaptors within the computer system's operating system. Each endpoint (i.e. each computer system or tenant) in the virtual network may receive a unique address or other identifier from a directory service that allows the computer system to communicate with other endpoints in the virtual network. A driver or software agent installed on the computer systems that participate in the virtual network may be responsible for sending IP traffic through the relay service 105 and accepting traffic from the relay service.

In some embodiments, the multi-tenant relay service 105 is configured to create isolated routing domains that interact with the relay service. Each routing domain can restrict access to a set of authorized (tenant or host) machines and can provide a namespace to uniquely identify the machines in the domain. This not only secures access to the relay service but also partitions access between computer systems once they are connected to the relay service. In one embodiment, a multi-tenant relay service may provide one or more isolated routing domains that may be used to construct virtual networks. In some cases, a secure socket tunneling protocol (SSTP) relay may be instantiated that assigns IP addresses from a specific subnet based on the identity of the tenant. These and other concepts will be described in greater detail below with regard to methods 200 and 300 of FIGS. 2 and 3, respectively.

Figure 2:
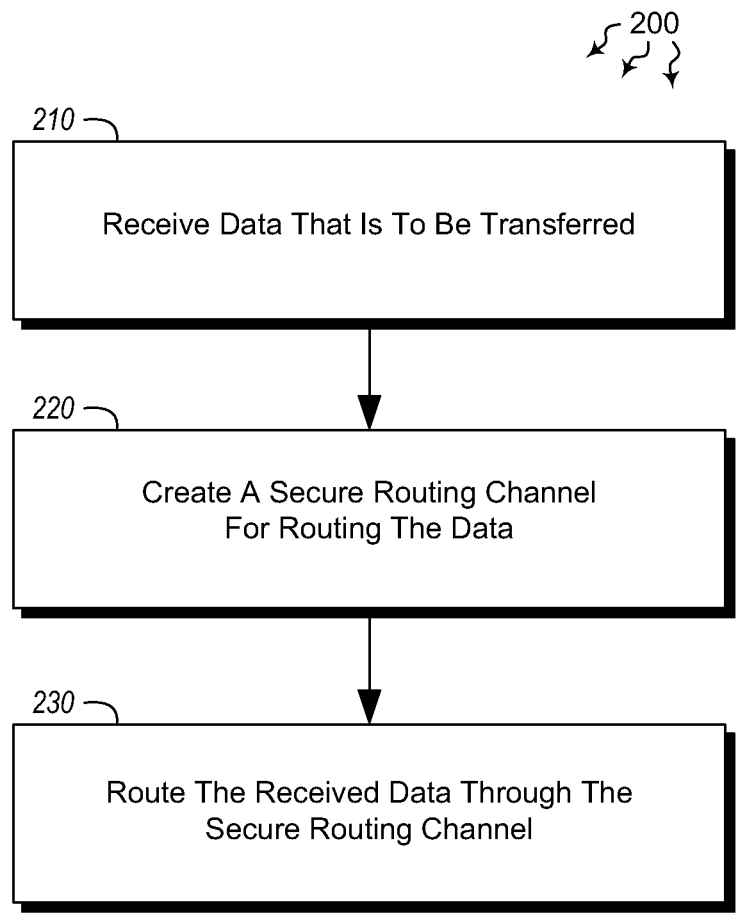
FIG. 2 illustrates a flowchart of an example method for providing a multi-tenant relay service that securely relays data between computer systems.
Figure 3:
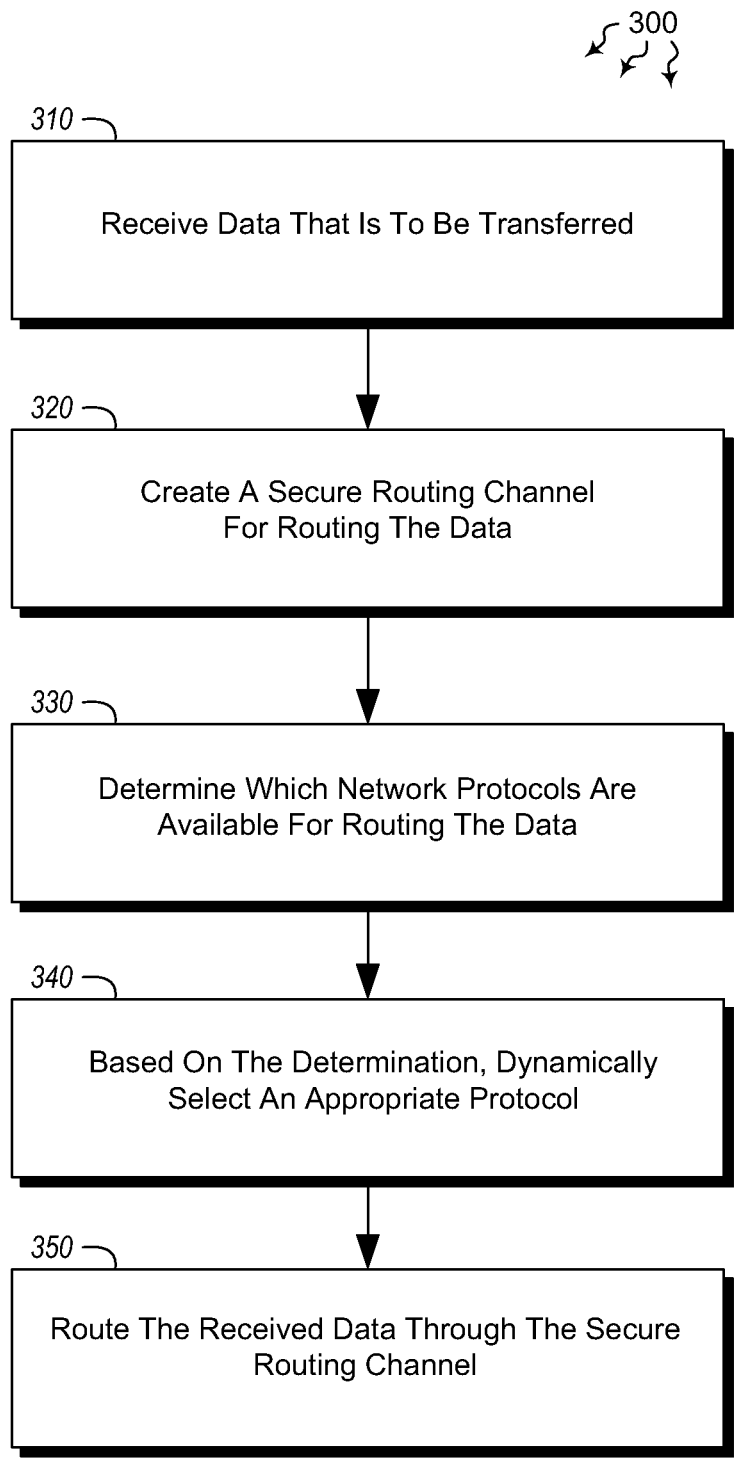
FIG. 3 illustrates a flowchart of an alternative example method for providing a multi-tenant relay service that securely relays data between computer systems.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing a multi-tenant relay service that securely relays data between computer systems. The method 200 will now be described with frequent reference to the components and data of environment 100.

Method 200 includes an act of receiving at an instantiated multi-tenant relay service a portion of data that is to be passed from a first computer system belonging to a first tenant to a second, different computer system, wherein the instantiated multi-tenant relay service is configured to securely relay data for a plurality of different tenants (act 210). For example, multi-tenant relay service 105 may receive data 106 that is to be passed from tenant 1 (120) to host 135. The relay service may be configured to securely relay data for multiple different tenants. In some cases, the relay service may uniquely identify each computer system (e.g. 121A1) as a computer system belonging to a certain tenant (e.g. tenant 120). In other cases, the relay service may uniquely identify the data as coming from a certain tenant, regardless of which computer system the data came from. Accordingly, the unique ID 107 attached to the data by relay service 105 may uniquely identify the tenant from which the data was received and/or the specific computer system or user that is part of tenant 120.

As indicated above, the host and tenant computer systems may be distributed physically, or may be distributed over different networks locally. The multi-tenant relay service may also be run on a plurality of distributed computer systems. In such cases, the relay service may determine which paths are optimal (e.g. highest bandwidth, most secure, shortest path, etc.) and may use the preferred paths to route the data 106. In some embodiments, a software agent may be installed or otherwise provided for each computer system that connects to the multi-tenant relay service. The agent may be responsible for joining the computer systems to the relay service and/or providing domain name system (DNS) services for IP address translation. Thus, within the virtual network established using the relay service, computer systems may use DNS in their communications. In some cases, the multi-tenant relay service is an IP-level relay. In such cases, communications between the first and second computer systems are governed at the IP level.

Method 200 includes an act of the multi-tenant relay service creating a secure routing channel for routing the data of the first tenant between the first computer system and the second computer system, wherein the secure routing channel applies a unique identifier to each portion of data received from the first tenant (act 220). For example, multi-tenant relay service 105 may create secure routing channel 110 for routing data 106 between tenant 120 and host 135. The secure routing channel may apply unique ID 107 to each portion of data received from tenant 120. Additionally or alternatively, the secure routing channel may apply the unique ID to each portion of data received from a specific computer system of the tenant (e.g. from computer system 121A2).

Creating a secure routing channel may include creating IP address space for routing between IP addresses in the secure routing channel. In cases where DNS is used, the unique ID 107 applied to the tenant's data may be mapped from the tenant to the DNS name for the first computer system (e.g. 121A2) to resolve the first computer's DNS name. Thus, the DNS name of the computer that sent data 106 is mapped to the unique ID applied by the secure routing channel.

As mentioned previously, the unique identifier 107 may be applied to all data received from a certain tenant (e.g. tenant 120), regardless of which computer system or plurality of computer systems the data is received from. In this manner, the applied unique identifier allows each tenant to have their own unique namespace within the multi-tenant relay service, as each portion of data transferred between the tenant and host is uniquely identified as being from the tenant. Similarly, the unique identifier 107 may be applied to all data received from a certain computer system, where each portion of data transferred between the computer system and host is uniquely identified as being from that computer system. Thus, the data from a given tenant (regardless of which of the tenant's users is sending the data) is kept separate from the data of other tenants. This adds a measure of security to the data transfers. This added security (among other features) allows the relay service 105 to provide security guarantees to the tenants using the service. This may be especially important for services involving private, financial, classified or other information that needs to be transmitted in a secure environment.

Method 200 includes an act of the multi-tenant relay service routing the received data from the first computer system to the second computer system through the secure routing channel using the applied unique identifier (act 230). For example, relay service 105 may route data 106 from tenant 120 to host 135 through secure routing channel 110 using the applied unique identifier 107. The unique identifier is applied to all data transferred through the secure routing channel, to and from the tenant and host. In some cases, multiple different tenants send data to and receive data from host 135.

Figure 4:
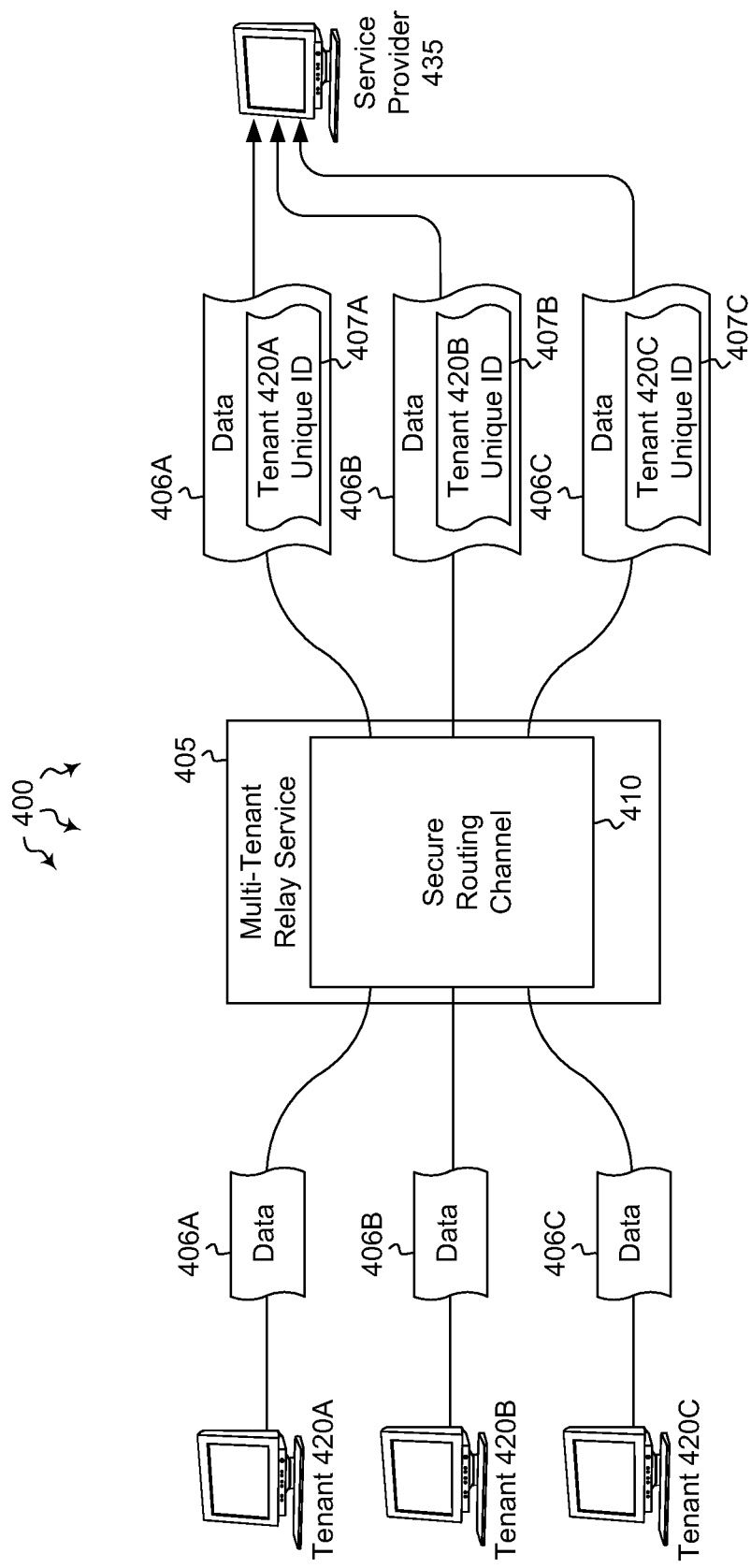
FIG. 4 illustrates an embodiment of the present invention in which communications from multiple tenants are securely routed through a secure routing channel.

For instance, as shown in computer environment 400 of FIG. 4, tenants 420A, 420B and 420C may each send different data to multi-tenant relay service 405. Specifically, tenant 420A sends data 406A to the secure routing channel 410 of relay service 405. The secure routing channel then applies a unique identifier (tenant 420A unique ID) 407A and transfers the data to service provider 435. Similarly, tenants 420B and 420C send data 406B and 406C to the secure routing channel 410 of relay service 405. The secure routing channel then applies unique identifiers (tenant 420B unique ID and tenant 420C unique ID) 407B and 407C, respectively, and transfers the data to service provider 435.

Each tenant's data is kept separate and secure from the other tenant's data, even if the tenants are connecting to the same service. Moreover, each tenant's data is uniquely identified as being from a given tenant (or from a specific user/computer system of the tenant). Thus, even in cases where two of the tenants have the same IP address, the data can be separated and routed with each tenant having its own unique identifier. In this manner, the relay service can securely relay information between tenant and host. Data traveling back to the tenant's computer system(s) maintains the unique ID assigned to it by the secure routing channel. Moreover, applications running on the tenant's computer system(s) can appear to connect directly to applications or services running on the host system, without network address translation, because the communication data is channeled through the secure routing channel over a virtual network between the source and the destination.

Turning now to FIG. 3, FIG. 3 illustrates a flowchart of a method 300 for providing a multi-tenant relay service that securely relays data between computer systems. The method 300 will now be described with frequent reference to the components and data of environment 100.

Method 300 includes an act of receiving at an instantiated multi-tenant relay service a portion of data that is to be passed from a first computer system to a second, different computer system, wherein the instantiated multi-tenant relay service is configured to relay data for a plurality of different tenants (act 310). For example, multi-tenant relay service 105 may receive data 106 that is to be passed from computer system 121A3 to one of host 135's computer systems 131A1, 131A2 or 131A3. As indicated above, relay service 105 may be configured to relay data for a variety of different tenants. Some tenants may include one computer user and some tenants may include many thousands or more users. The relay service may uniquely identify a computer system such as 121A3 as belonging to tenant 120. Additionally or alternatively, the relay service may identify a computer user as belonging to a tenant, regardless of which computer system the user is using. For instance, the user may authenticate as a member of tenant 120, and from that authentication, gain access to the services to which the tenant has subscribed.

Method 300 further includes an act of the multi-tenant relay service creating a secure routing channel for routing the data between the first computer system and the second computer system, wherein the secure routing channel provides a unique identifier to each portion of data received from the first tenant (act 320). For example, multi-tenant relay service 105 may create secure routing channel 110 for routing or relaying data between tenant 120 and host 135. The secure routing channel applies a unique identifier 107 to each portion of data received from a given computer user or computer system.

Method 300 includes an act of determining which of a plurality of different network protocols are available for routing the received data (act 330). For example, relay service 105 may determine which network protocols are available for routing data 106. The protocols may include hypertext transfer protocol (HTTP), transmission control protocol (TCP), internet protocol (IP) or any other protocol for transferring data over a network. The relay service may also determine whether local networks are available for transferring the data. Then, based on the determination of which network protocols are available, the relay service may dynamically select an appropriate protocol that optimizes data transport efficiency (act 340). For example, if a local network is available, and determined to be secure, the local network may be selected as being the most efficient and protocols over the local network will be used to transfer the data. After an initial selection is made, if changes occur to the network, the relay service may reevaluate which available protocol is most appropriate for transferring data.

Method 300 also includes an act of routing the received data from the first computer system to the second computer system using the determined protocol, wherein the data is routed through the secure routing channel using the applied unique identifier (act 350). For example, secure routing channel 110 of relay service 105 may route data 106 from tenant 120 to host 135 using the determined protocol. The data, which has the unique identifier 107 attached to it, is transferred using HTTP, TCP, IP or some other determined appropriate protocol. In some cases, if the tenant and host are on the same local computer network, the relay service may direct the two systems to connect on the local network without either system leaving the firewalled environment. By selecting the most efficient (and secure) protocol, optimal routing efficiency can be ensured.

Thus, methods, systems and computer program products are provided which provide a multi-tenant relay service that securely relays data between computer systems. The system can use local networks when available and can select among available protocols to use the most efficient protocol for the situation. The relay service can establish and maintain a virtual network between a tenant and a host by securely relaying and uniquely identifying the data it receives from each tenant. In this manner, a multi-tenant relay service can service a multi-tenant host.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for providing a multi-tenant relay service that securely relays data between computer systems, the method comprising:

receiving at an multi-tenant relay service a portion of data that is to be passed from a first computer system belonging to a first tenant to a second, different computer system, wherein the multi-tenant relay service is configured to securely relay data for a plurality of different tenants, the multi-tenant relay service providing a set of isolated routing domains, each routing domain comprising a particular set of machines, each routing domain providing a namespace which uniquely identifies the particular set of machines in each of the set of isolated routing domains and partitions access within the multi-tenant relay service into the sets of machines corresponding to each namespace;

the multi-tenant relay service creating a secure routing channel for routing the data of the first tenant between the first computer system and the second computer system, wherein the secure routing channel applies a unique identifier to each portion of data received from the first tenant, wherein the unique identifier corresponds to a particular computer and a DNS name for the particular computer;

determining which of a plurality of different network protocols are available for routing the received data;

based on the determination of which network protocols are available, dynamically selecting an appropriate protocol that optimizes data transport efficiency;

the multi-tenant relay service determining which part of a plurality of paths is an optimal path for routing the received data from the first computer system to the second computer system; and the multi-tenant relay service routing the received data from the first computer system to the second computer system through the secure routing channel using the applied unique identifier and using the determined optimal path.

2. The method of claim 1, further comprising:

receiving at the multi-tenant relay service a portion of data from a third, different computer system belonging to a second, different tenant;

the multi-tenant relay service applying a different unique identifier to each portion of information received from the second tenant; and the multi-tenant relay service routing the received data from the third computer system to the second computer system through the secure routing channel using the applied, different unique identifier.

3. The method of claim 2, wherein the data received from the second tenant is isolated from the data received from the first tenant, even if the second tenant is connecting to the same service the first tenant is connecting to, which is provided by the second computer system.

4. The method of claim 2, wherein the first computer system of the first tenant and the third computer system of the second tenant have the same IP address.

5. The method of claim 1, wherein creating a secure routing channel comprises creating IP address space for routing between IP addresses in the secure routing channel.

6. The method of claim 1, further comprising mapping the unique identifier for tenant data from the first tenant to the DNS name for the first computer system to resolve the first computer's DNS name.

7. The method of claim 1, wherein the unique identifier is applied to all data received from the first tenant, regardless of which computer system or plurality of computer systems the data is received from.

8. The method of claim 1, wherein the applied unique identifier allows each tenant to have their own unique namespace within the multi-tenant relay service.

9. The method of claim 1, wherein applications running on the first computer system appear to connect directly to applications or services running on the second computer system, without network address translation, because the communication data is channeled through the secure routing channel over a virtual connection.

10. The method of claim 1, wherein the relay service is run on a plurality of distributed computer systems.

11. The method of claim 10, wherein data paths are optimized over the plurality of distributed computer systems.

12. The method of claim 1, wherein the multi-tenant relay service provides one or more security guarantees to the tenants using the service.

13. The method of claim 1, further comprising an act of providing a software agent on for each computer system that connects to the multi-tenant relay service.

14. The method of claim 13, wherein the agent joins the machine to the multi-tenant relay service and provides additional services including DNS services for IP address translation.

15. The method of claim 1, wherein the multi-tenant relay service comprises an IP-level relay, such that communications between the first and second computer systems are governed at the IP level.

16. A computer program product for implementing a method for providing a multi-tenant relay service that securely relays data between computer systems, the computer program product comprising one or more computer-readable storage devices having stored thereon computer-executable instructions that, when executed by one or more processors of the computing system, cause the computing system to perform the method, the method comprising:

receiving at an multi-tenant relay service a portion of data that is to be passed from a first computer system to a second, different computer system, wherein the multi-tenant relay service is configured to relay data for a plurality of different tenants, the multi-tenant relay service providing a set of isolated routing domains, each routing domain comprising a particular set of machines, each routing domain providing a namespace which uniquely identifies the particular set of machines in each of the set of isolated routing domains and partitions access within the multi-tenant relay service into the sets of machines corresponding to each namespace;

the multi-tenant relay service creating a secure routing channel for routing the data between the first computer system and the second computer system, wherein the secure routing channel provides a unique identifier to each portion of data received from the first tenant, wherein the unique identifier corresponds to a particular computer and a DNS name for the particular computer determining which of the plurality of different network protocols are available for routing the received data;

based on the determination of which network protocols are available, dynamically selecting an appropriate protocol that optimizes data transport efficiency;

the multi-tenant relay service determining which path of a plurality of paths is an optimal path for routing the received data from the first computer system to the second computer system; and routing the received data from the first computer system to the second computer system using the determined protocol, wherein the data is routed through the secure routing channel using the applied unique identifier and using the determined optimal path.

17. The computer program product of claim 16, wherein if the first computer system and the second computer system are in the same network, the multi-tenant relay service directs the two systems to connect locally on the local network without either system leaving the local network through a firewall.

18. The computer program product of claim 17, wherein the local network is determined to be secure.

19. The computer program product of claim 16, wherein upon determining that one or more changes have occurred to the network, an act of reevaluating which available protocol is most appropriate for transferring data.

20. A computer system comprising the following:
one or more processors;
system memory;
one or more computer-readable storage media having stored thereon computer-executable instructions that, when executed by the one or more processors, causes the computing system to perform a method for providing a multi-tenant relay service that securely relays data between computer systems, the method comprising the following:
  receiving at an multi-tenant relay service a portion of data that is to be passed from a first computer system belonging to a first tenant to a second, different computer system, wherein the multi-tenant relay service is configured to securely relay data for a plurality of different tenants, the multi-tenant relay service providing a set of isolated routing domains, each routing domain comprising a particular set of machines, each routing domains providing a namespace which uniquely identifies the particular set of machines in each of the set of isolated routing domains and partitions access within the multi-tenant relay service into the sets of machines corresponding to each namespace;
  the multi-tenant relay service creating a secure routing channel for routing the data of the first tenant between the first computer system and the second computer system, wherein the secure routing channel applies a unique identifier to each portion of data received from the first tenant, wherein the unique identifier corresponds to a particular computer and a DNS name for the particular computer;
  determining which of a plurality of different network protocols are available for routing the received data;
  based on the determination of which network protocols are available, dynamically selecting an appropriate protocol that optimizes data transport efficiency;
  the multi-tenant relay service determining which path of a plurality of paths is an optimal path for routing the received data from the first computer system to the second computer system;
  the multi-tenant relay service routing the received data from the first computer system to the second computer system through the secure routing channel using the applied unique identifier and using the determined optimal path;
  receiving at the multi-tenant relay service a portion of data from a third, different computer system belonging to a second, different tenant;
  the multi-tenant relay service applying a different unique identifier to each portion of information received from the second tenant; and
the multi-tenant relay service routing the received data from the third computer system to the second computer system through the secure routing channel using the applied, different unique identifier.

* * * * *